United States Patent
Philip et al.

(10) Patent No.: US 12,141,292 B2
(45) Date of Patent: Nov. 12, 2024

(54) TRACKING AND MITIGATING SECURITY THREATS AND VULNERABILITIES IN BROWSER EXTENSION ENGINES

(71) Applicant: Bank of America Corporation, Charlotte, NC (US)

(72) Inventors: Charles Philip, Mumbai (IN); Priya Birendra Yadav, Dombivli (IN)

(73) Assignee: Bank of America Corporation, Charlotte, NC (US)

( * ) Notice: Subject to any disclaimer, the term of this patent is extended or adjusted under 35 U.S.C. 154(b) by 132 days.

(21) Appl. No.: 17/396,229

(22) Filed: Aug. 6, 2021

(65) Prior Publication Data

US 2023/0039079 A1    Feb. 9, 2023

(51) Int. Cl.
G06F 21/57    (2013.01)

(52) U.S. Cl.
CPC ...... G06F 21/577 (2013.01); *G06F 2221/033* (2013.01)

(58) Field of Classification Search
CPC .................. G06F 21/577; G06F 2221/033
USPC ........................................................ 726/25
See application file for complete search history.

(56) References Cited

U.S. PATENT DOCUMENTS

| | | | |
|---|---|---|---|
| 7,293,098 B2 | 11/2007 | Sandhu et al. | |
| 8,365,291 B1 * | 1/2013 | Le ................... | G06F 21/6263 |
| | | | 726/25 |
| 8,381,272 B1 | 2/2013 | Nelson et al. | |
| 8,527,757 B2 | 9/2013 | Lu et al. | |
| 8,713,644 B2 | 4/2014 | Krishna et al. | |
| 10,826,872 B2 | 11/2020 | Yang et al. | |
| 10,834,082 B2 | 11/2020 | Call | |
| 2017/0195293 A1 | 7/2017 | Dahan et al. | |
| 2017/0353476 A1 * | 12/2017 | Gordon ............. | G06F 21/568 |
| 2018/0329801 A1 * | 11/2018 | McKee ............. | G06F 11/3624 |
| 2019/0215304 A1 * | 7/2019 | Yang ................. | G06F 21/629 |
| 2019/0243970 A1 * | 8/2019 | Vinogradov ...... | G06F 21/554 |
| 2019/0281059 A1 * | 9/2019 | Chittampally ..... | G06F 16/953 |
| 2020/0250316 A1 * | 8/2020 | Rickerd ............ | G06F 9/44526 |
| 2022/0222089 A1 * | 7/2022 | Joshi ................. | G06F 16/953 |
| 2022/0360599 A1 * | 11/2022 | Corron .............. | H04L 63/1483 |
| 2022/0414206 A1 * | 12/2022 | Hinkle .............. | G06F 16/951 |

* cited by examiner

*Primary Examiner* — Rodman Alexander Mahmoudi
*Assistant Examiner* — Ghizlane Maazouz
(74) *Attorney, Agent, or Firm* — Banner & Witcoff, Ltd.

(57) ABSTRACT

Aspects of the disclosure relate to tracking and mitigating security threats and vulnerabilities in browser extension engines. A computing platform may receive, via the communication interface, an indication of a user request to use a first browser extension at a first user computing device. The computing platform may then analyze the first browser extension to identify one or more potential vulnerabilities in the first browser extension, including performing an examination process on code associated with the first browser extension. Based on identifying one or more potential vulnerabilities, the computing platform may thereafter determine whether the user has an exception associated with each potential vulnerability. Upon detecting no exception for the user, the computing platform may then identify at least one corrective action associated with each potential vulnerability and transmit, to the first user computing device, instructions to perform the at least one corrective action.

17 Claims, 11 Drawing Sheets

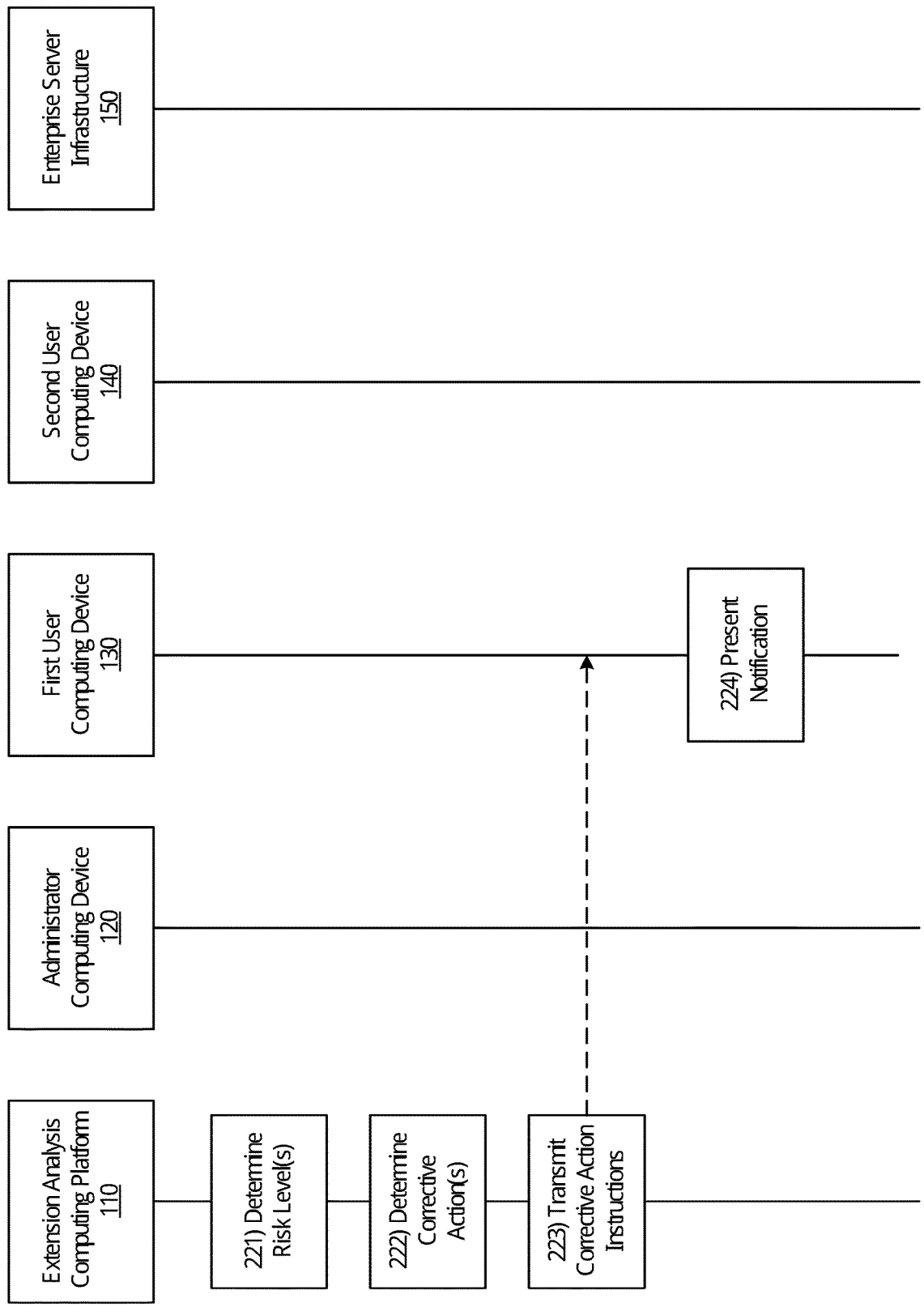

TRACKING AND MITIGATING SECURITY THREATS AND VULNERABILITIES IN BROWSER EXTENSION ENGINES

BACKGROUND

Aspects of the disclosure relate to detecting and preventing cybersecurity threats. In particular, one or more aspects of the disclosure relate to computing platforms that track and mitigate security threats and vulnerabilities in browser extension engines.

Publicly available web browser extensions may provide users with access to different applications for various platforms. While many web browser extensions are useful and can provide a customized browser experience, some web browser extensions may be harmful and may compromise computer security. In some instances, web browser extensions may be granted permissions (e.g., to access user data) by default (e.g., without user confirmation). Users are often unaware of where such instances exist in web browser extensions, or even how to detect such instances in a given web browser extension. Also, in some instances, code for extensions may run as part of a browser (e.g., an already trusted application), and it thus may be difficult to detect and prevent extensions that are or may be potentially harmful. As such, a user's private and/or sensitive information (e.g., login credentials, security keys, and the like) may potentially be exposed to a third party during networked communications, such as when communicating with a server device via a web browser. Accordingly, enterprise organizations and/or other individuals may experience difficulties trying to track and mitigate potential vulnerabilities in various web browser extensions.

SUMMARY

Aspects of the disclosure provide effective, efficient, scalable, and convenient technical solutions that address and overcome the technical problems associated with tracking and mitigating security threats and vulnerabilities in web browser extensions. In accordance with one or more embodiments of the disclosure, a computing platform comprising at least one processor, a communication interface, and memory storing computer-readable instructions may receive, via the communication interface, an indication of a user request to use a first browser extension at a first user computing device. The computing platform may analyze the first browser extension to identify one or more potential vulnerabilities in the first browser extension. Analyzing the first browser extension may include performing an examination process on code associated with the first browser extension. Based on identifying one or more potential vulnerabilities, the computing platform may thereafter determine whether the user has an exception associated with each potential vulnerability. Upon detecting a lack of an exception for the user, the computing platform may identify at least one corrective action associated with each potential vulnerability. The computing platform may transmit, to the first user computing device, instructions to perform the at least one corrective action.

In one or more instances, identifying at least one corrective action may include identifying a corrective action from a corrective action list that includes disabling a browser extension, blocking a browser extension, and removing a browser extension from a user computing device. In some instances, transmitting instructions to perform the at least one corrective action may include transmitting a notification to the first user computing device. In such instances, the notification may include an identification of the one or more potential vulnerabilities associated with the first browser extension.

In one or more instances, analyzing the first browser extension may include examining a manifest file associated with the first browser extension. In some instances, analyzing the first browser extension may include reviewing code associated with the first browser extension for commands that match a predefined list of commands associated with potential vulnerabilities. Additionally, in these instances, the predefined list of commands associated with potential vulnerabilities may be dynamically updated with a machine learning engine based on vulnerability reports received from at least one user computing device associated with an enterprise organization.

In one or more instances, analyzing the first browser extension may include determining if the first browser extension was previously analyzed and accessing a prior analysis report if the first browser extension was previously analyzed. In some instances, analyzing the first browser extension may include determining a risk level from a plurality of risk levels for each identified potential vulnerability. In such instances, the at least one corrective action may be determined based on the determined risk level. Still in some instances, determining whether the user has an exception may include accessing a user profile from an enterprise system associated with the first user computing device.

In one or more instances, upon detecting an exception for the user, the computing platform may transmit, to the first user computing device, an instruction to display a notification that the first browser extension has potential vulnerabilities and that the user has an exception to access the first browser extension. The computing platform may then allow the first user computing device to access the first browser extension. In some instances, the computing platform receive a use record from the first user computing device. The use record may include a list of one or more browser extensions that the first user computing device used or attempted to use and an analysis of potential vulnerabilities associated with each of the one or more browser extensions. Additionally, in these instances, the computing platform may train a machine learning model to data in the use record to establish one or more factors for a potential vulnerability from a browser extension.

In accordance with one or more embodiments, a method is provided at a computing platform comprising at least one processor, a communication interface, and memory. The method may include receiving, via the communication interface, an indication of a user request to use a first browser extension at a first user computing device, and analyzing the first browser extension to identify one or more potential vulnerabilities in the first browser extension. Analyzing the first browser extension may include performing an examination process on code associated with the first browser extension, and identifying one or more commands in the first browser extension that match a predefined list of commands associated with potential vulnerabilities. The method may then include based on identifying one or more potential vulnerabilities, determining at least one corrective action associated with each potential vulnerability, and transmitting, to the first user computing device, instructions to perform the at least one corrective action.

In one or more instances, transmitting instructions to perform the at least one corrective action may include transmitting a notification to the first user computing device.

In such instances, the notification may include an identification of the one or more potential vulnerabilities associated with the first browser extension. Identifying the at least one corrective action may include identifying a corrective action from a corrective action list that includes disabling a browser extension, blocking a browser extension, and removing a browser extension from a user computing device.

In one or more instances, the method may include dynamically updating the predefined list of commands associated with potential vulnerabilities with a machine learning engine based on vulnerability reports received from at least one user computing device associated with an enterprise organization. In some instances, analyzing the first browser extension may include determining if the first browser extension was previously analyzed and accessing a prior analysis report if the first browser extension was previously analyzed. In some instances, analyzing the first browser extension may include determining a risk level from a plurality of risk levels for each identified potential vulnerability. In such instances, the at least one corrective action may be determined based on the risk level.

In one or more instances, the method may include receiving a use record from the first user computing device. The use record may include a list of one or more browser extensions that the first user computing device used or attempted to use and analysis of potential vulnerabilities associated with each of the one or more browser extensions. In such instances, the method may then include training a machine learning model to data in the use record to establish one or more factors for a potential vulnerability from a browser extension.

In one or more instances, the method may include determining whether the user has an exception associated with each identified potential vulnerability and, upon determining an exception for the user, transmitting, to the first user computing device, an instruction to display a notification that the first browser extension has potential vulnerabilities and that the user has an exception to access the first browser extension and an instruction to allow the first user computing device to access the first browser extension.

In accordance with one or more embodiments, one or more non-transitory computer-readable media may be provided storing instructions that, when executed by a computing platform comprising at least one processor, a communication interface, and memory cause the computing platform to receive, via the communication interface, an indication of a user request to use a first browser extension at a first user computing device, analyze the first browser extension to identify one or more potential vulnerabilities in the first browser extension, wherein analyzing the first browser extension includes performing an examination process on code associated with the first browser extension, based on identifying one or more potential vulnerabilities, determine whether the user has an exception associated with each potential vulnerability, upon determining an exception for the user, transmit instructions to the first user computing device to allow use of the first browser extension, and, upon determining no exceptions for the user, transmit, to the first user computing device, instructions to perform the at least one corrective action, wherein the at least one corrective action is identified based on each potential vulnerability.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for tracking and mitigating security threats and vulnerabilities in browser extension engines in accordance with one or more example embodiments;

DETAILED DESCRIPTION

Figure 1A:
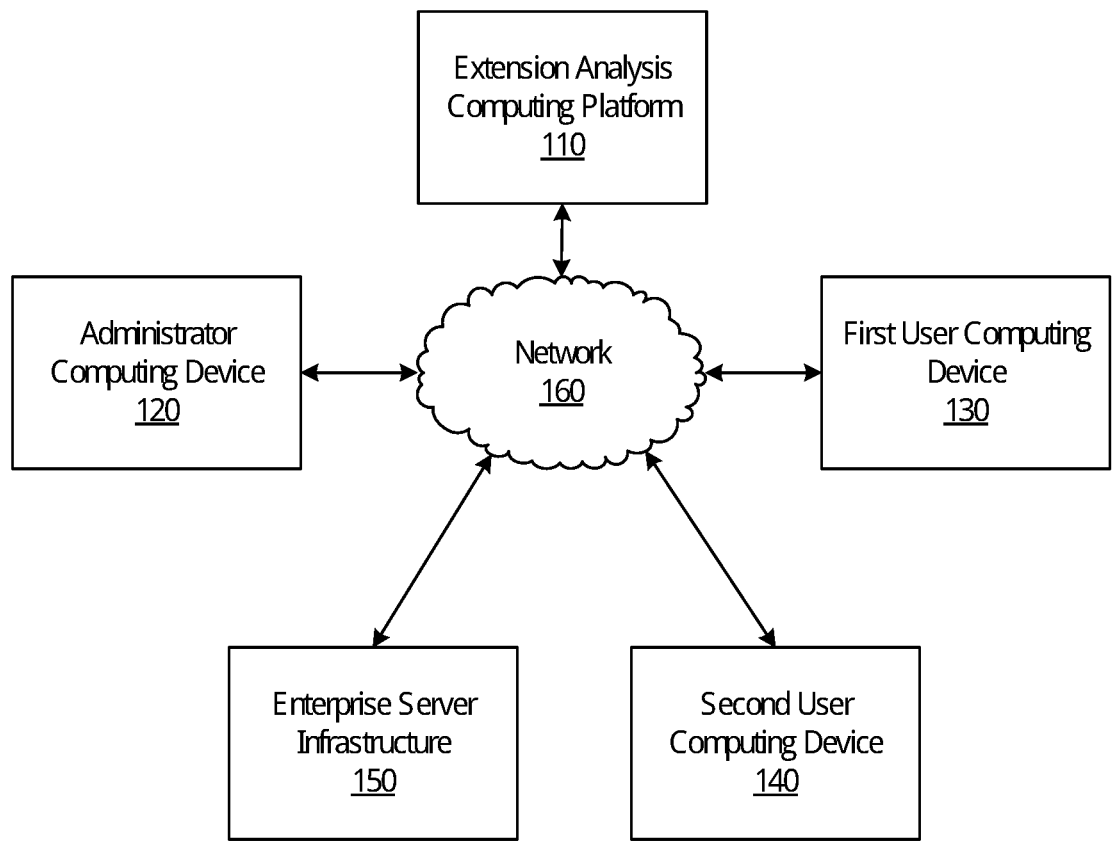
FIGS. 1A-1B depict an illustrative computing environment for implementing in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for tracking and mitigating security threats and vulnerabilities in browser extension engines. The increasingly widespread use and reliance on browser extensions result in a growing number of potential cybersecurity threats. Browser extensions often have access to user data, including sensitive and confidential user data, as well as permissions to modify the browser itself. Further, extension application program interface (API) calls with the browser may be prone to leaks, thus potentially exposing user data to malicious sites. Vulnerabilities in various browser extensions may be difficult to detect manually, and there are no tools in place that can effectively track or detect browser extensions throughout their uses across an enterprise organization, or to effectively mitigate potential threats or vulnerabilities involving specific browser extensions or groups of browser extensions.

Accordingly, one or more of the systems and methods described herein provide technical solutions to address one or more of these technical deficiencies. To do so, the aspects described herein may employ a browser extension engine to track potential cyber security threats in web browser extensions, and to take one or more mitigating actions in response to detecting cyber security threats in the web browser extensions. For example, the browser extension engine of the computing platform may interpret a manifest file of browser extensions that describes the resources the extensions access during standard functioning, e.g., by examining lines of code in each browser extension. The browser extension engine of the computing platform may also examine and track security threats associated with websites obtaining user data through web browser extensions. By examining lines of code in web browser extensions, the browser extension engine of the computing platform may mitigate and prevent cross-site security threats or attacks. In addition to mitigating security threats or attacks, a security assessment may be provided that relates to the assessed security of a browser extension as a potential cyberattack vector. The security assessment may include results and recommendations, e.g., which may be tailored specifically to users, developers, enterprise administrators, browser extensions owners, and the like.

In some examples, a rule engine may be employed to detect browser extensions that may be subject to potential cyber threats, cyber-attacks, or other potentially malicious activities. The rule engine may also track browser extension behavior and open vulnerabilities in a browser extension code. In some examples, the rule engine may also store, obtain, or otherwise access user profile data to determine whether an exception applies to a particular user with respect to using browser extensions with an identified vulnerability.

Accordingly, various operational benefits are possible using the browser extension engine, such as detecting software vulnerabilities on browser extensions, assigning varying risk levels to detected software vulnerabilities, identifying authentication risks, identifying suspicious data exfiltration techniques or activities, identifying call back option coded in browser extensions (e.g., post, chat, message, local caches or cookies, and the like). Additionally the browser extension engine may be easy to integrate, may be scalable, and may be operable independent of specific web browsers.

Figure 1B:
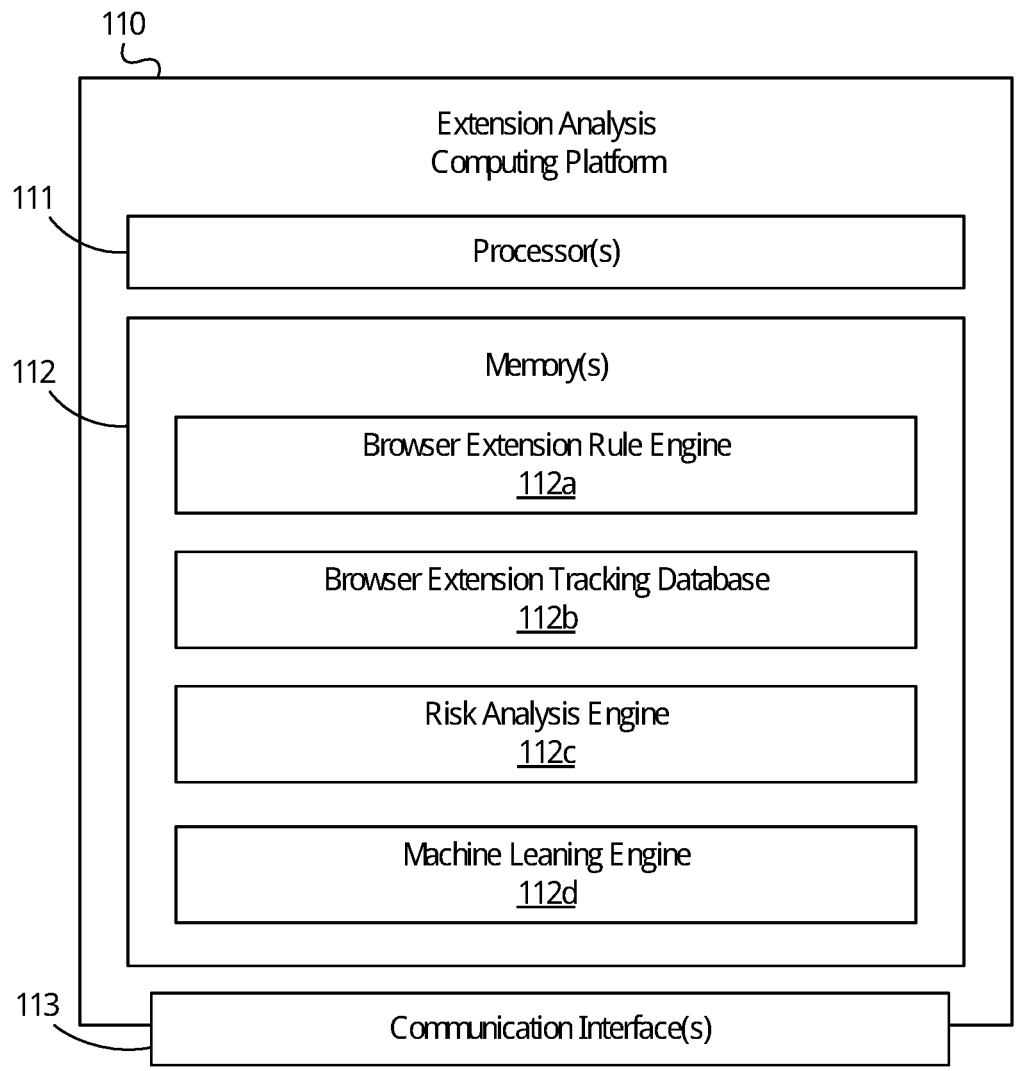

FIGS. 1A-1B depict an illustrative computing environment that tracks and mitigates security threats and vulnerabilities in browser extension engines in accordance with one or more example embodiments. Referring to FIG. 1A, computing environment 100 may include one or more computer systems. For example, computing environment 100 may include an extension analysis computing platform 110, an administrator computing device 120, a first user computing device 130, a second user computing device 140, and an enterprise server infrastructure 150.

As described further below, extension analysis computing platform 110 may include a computer system that includes one or more computing devices (e.g., servers, server blades, or the like) and/or other computer components (e.g., processors, memories, communication interfaces) that may be used to track and analyze web browser extensions and mitigate security threats and potential vulnerabilities to various systems across an enterprise organization. In some instances, the extension analysis computing platform 110 may maintain a database of analyzed web browser extensions and related security threats or vulnerabilities associated with those extensions, and the extension analysis computing platform 110 may use such a database to determine one or more corrective actions responsive to those security threats or vulnerabilities.

Extension analysis computing platform 110 may include one or more computing devices configured to perform one or more of the functions described herein. For example, extension analysis computing platform 110 may include one or more computers (e.g., laptop computers, desktop computers, servers, server blades, or the like) configured to perform one or more of the functions described herein, as discussed in greater detail below. Extension analysis computing platform 110 may be configured to host and/or execute a machine learning engine to provide more efficient browser extension tracking. In some examples, extension analysis computing platform 110 may be connected to one or more enterprise computing platforms or devices to receive user account information and/or enterprise security information.

Extension analysis computing platform 110 may include distinct and physically separate data centers or other groupings of server computers that are operated by and/or otherwise associated with an organization, such as a financial institution. In addition, extension analysis computing platform 110 may house a plurality of server computers and various other computers, network components, and devices. For example, extension analysis computing platform 110 may include a plurality of server nodes that are made up of and/or otherwise include one or more servers and/or server blades, which may be monitored and/or controlled by extension analysis computing platform 110 and/or one or more other computing devices included in computing environment 100. Each server and/or server blade included in the plurality of server nodes associated with extension analysis computing platform 110 may include one or more processors, memories, communication interfaces, storage devices, and/or other components.

Administrator computing device 120 may include one or more computing devices and/or other computer components (e.g., processors, memories, communication interfaces). In addition, and as illustrated in greater detail below, administrator computing device 120 may be configured to receive information from, send information to, and/or otherwise exchange information with one or more devices that are physically present at and/or within a certain range of the enterprise location at which enterprise server infrastructure 150 may be deployed. In some examples, however, the administrator computing device 120 may be remote from and/or different from the enterprise location (e.g., where enterprise server infrastructure 150 is deployed).

Administrator computing device 120 may be a desktop computing device (e.g., desktop computer, terminal), or the like or a mobile computing device (e.g., smartphone, tablet, smart watch, laptop computer, or the like). In addition, the administrator computing device 120 may be linked to and/or used by one or more enterprise users (who may, e.g., be employees of an enterprise organization operating the enterprise center where administrator computing device 120 is deployed and/or used). For instance, the administrator computing device 120 may be deployed at an enterprise center, such as the enterprise center where enterprise server infrastructure 150 is deployed, so that administrator computing device 120 may be used by one or more employees of an enterprise organization operating the enterprise center when such employees are facilitating enterprise software development efforts. For example, the administrator computing device 120 may store and/or execute one or more enterprise applications, such as user account management applications, user history applications, account security applications, and/or other software applications, which may be used by the one or more enterprise users of the administrator computing device 120.

In one or more arrangements, the administrator computing device 120, and other computing devices included in computing environment 100 may be any type of computing device capable of receiving a user interface, receiving input via the user interface, and communicating the received input to one or more other computing devices. For example, the administrator computing device 120 may, in some instances, be and/or include server computers, desktop computers, laptop computers, tablet computers, smart phones, or the like and may include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions. Extension analysis computing platform 110 and/or administrator computing device 120 may be configured to provide one or more interfaces that allow for configuration and management of one or more other computing devices and/or computer systems included in computing environment 100, such as one or more interfaces that allow for management of web browser extensions accessed by a user computing device, such as the first user computing device 130 or the second user computing device 140.

First user computing device 130 may include a laptop computer, desktop computer, mobile device, tablet, smartphone, or the like that may be used by an individual such as a client of an enterprise organization (e.g., a financial institution, or the like) and/or a regulatory agency. For example, the first user computing device 130 may be used by one or more individuals to request, access, or otherwise use various web browser extensions. In some instances, first user computing device 130 may be configured to display one or more user interfaces (e.g., providing notification of a determined security threat or vulnerability in a particular web browser extension, notification that access is blocked to a particular web browser extension and/or other interfaces).

Second user computing device 140 may include a laptop computer, desktop computer, mobile device, tablet, smartphone, or the like that may be used by an individual such as a client of an enterprise organization (e.g., a financial institution, or the like) and/or a regulatory agency. For example, the second user computing device 140 may be used by one or more individuals to request, access, or otherwise use various web browser extensions. In some instances, second user computing device 140 may be configured to display one or more user interfaces (e.g., providing notification of a determined security threat or vulnerability in a particular web browser extension, notification that access is blocked to a particular web browser extension and/or other interfaces).

Enterprise server infrastructure 150 may include one or more computing devices and/or other computer components (e.g., processors, memories, communication interfaces). In addition, enterprise server infrastructure 150 may be configured to host, execute, and/or otherwise provide one or more enterprise applications. For example, enterprise server infrastructure 150 may be configured to host, execute, and/or otherwise provide an enterprise mobile application for user devices, and/or other programs associated with an enterprise server. In some instances, enterprise server infrastructure 150 may be configured to provide various enterprise and/or back-office computing functions for an enterprise organization, such as a financial institution. For example, enterprise server infrastructure 150 may include various servers and/or databases that store and/or otherwise maintain account information, such as financial account information including account balances, transaction history, account owner information, and/or other information. In addition, enterprise server infrastructure 150 may process and/or otherwise execute tasks on specific accounts based on commands and/or other information received from other computer systems included in computing environment 100. Additionally, or alternatively, enterprise server infrastructure 150 may receive instructions from the extension analysis computing platform 110 and execute the instructions in a timely manner, e.g., for the tracking of web browser extensions.

Enterprise server infrastructure 150 may include one or more computing devices and/or other computer components (e.g., processors, memories, communication interfaces), and may be configured to perform one or more functions related to event processing (e.g., processing of a trade, or other events). For example, the enterprise server infrastructure 150 may include an order management system, an execution system, an allocation system, a usage system, a clearing system, a confirmation system, a payment system, a request for quote system, a settlement system, a position keeping system, and/or other systems involved in event processing.

Enterprise server infrastructure 150 may include multiple server computers that are owned, operated, maintained, and/or otherwise used by an organization, such as an enterprise organization associated with the extension analysis computing platform 110. For example, enterprise server infrastructure 150 may include one or more server computers that store and/or otherwise maintain enterprise applications (which may, e.g., be executed by and/or provided to one or more computing devices associated with enterprise users) and/or enterprise information (which may, e.g., be accessed and/or used by the enterprise applications and/or by the one or more computing devices associated the with enterprise users).

For example, enterprise server infrastructure 150 may include one or more computer systems that are configured to provide one or more portal interfaces to one or more client devices and/or configured to authenticate one or more client devices and/or users of such devices to such portal interfaces. For example, enterprise server infrastructure 150 may include a computer system configured to provide a customer portal, such as an online banking portal, to one or more customers of an organization, such as a financial institution, who may use one or more computing devices to access the portal and/or who may be authenticated to one or more portal user accounts by the computer system using various authentication techniques. In some instances, in addition to being configured to provide an online banking portal associated with a financial institution to one or more customers of the financial institution and/or their associated computing devices, the computer system (which may, e.g., be included in enterprise server infrastructure 150) also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Additionally or alternatively, enterprise server infrastructure 150 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating one or more computer systems in computing environment 100), to connect one or more customers of the organization with one or more customer service representatives of the organization via one or more telephone support sessions, chat support sessions, and/or other client support sessions.

Computing environment 100 also may include one or more networks, which may interconnect extension analysis computing platform 110, administrator computing device 120, first user computing device 130, second user computing device 140, and/or enterprise server infrastructure 150. For example, computing environment 100 may include a network 160 (which may interconnect, e.g., extension analysis computing platform 110, administrator computing device 120, first user computing device 130, second user computing device 140, and/or enterprise server infrastructure 150).

In one or more arrangements, extension analysis computing platform 110, administrator computing device 120, first user computing device 130, second user computing device 140, and/or enterprise server infrastructure 150 may include any type of computing device capable of sending and/or receiving requests and processing the requests accordingly. For example, extension analysis computing platform 110, administrator computing device 120, first user computing device 130, second user computing device 140, enterprise server infrastructure 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of extension analysis computing platform 110, administrator computing device 120, first user computing device 130, second user computing device 140, and/or enterprise server infrastructure 150, may, in some instances, include special-purpose computing devices configured to perform specific functions.

In some arrangements, extension analysis computing platform 110, administrator computing device 120, first user computing device 130, second user computing device 140, and/or enterprise server infrastructure 150 may be owned and/or operated by an enterprise organization, and/or deployed by enterprise centers that are owned and/or operated by the enterprise organization. As illustrated in greater detail below, some aspects of the disclosure may provide technical benefits that are not found in conventional systems, because extension analysis computing platform 110 is able to track various web browser extensions, e.g., for the purpose of mitigating security threats and vulnerabilities to data and computing systems. Machine learning (e.g., by extension analysis computing platform 110) may be used to efficiently monitor web browser extensions and mitigate instances where potential security threats or vulnerabilities have been identified.

Network 160 may include one or more sub-networks (e.g., Local Area Networks (LANs), Wide Area Networks (WANs), or the like). In some examples, network 160 may be associated with a particular organization (e.g., a corporation, financial institution, educational institution, governmental institution, or the like) and may interconnect one or more computing devices associated with the organization. For example, extension analysis computing platform 110, administrator computing device 120, first user computing device 130, second user computing device 140, and/or enterprise server infrastructure 150, may be associated with an organization (e.g., a financial institution), and network 160 may be associated with and/or operated by the organization, and may include one or more networks (e.g., LANs, WANs, virtual private networks (VPNs), or the like) that interconnect extension analysis extension analysis computing platform 110, administrator computing device 120, first user computing device 130, second user computing device 140, and/or enterprise server infrastructure 150, and one or more other computing devices and/or computer systems that are used by, operated by, and/or otherwise associated with the organization.

Referring to FIG. 1B, extension analysis computing platform 110 may include one or more processors 111, memory 112, and communication interface 113. A data bus may interconnect processor 111, memory 112, and communication interface 113. Communication interface 113 may be a network interface configured to support communication between extension analysis computing platform 110 and one or more networks (e.g., network 160, or the like). Memory 112 may include one or more program modules having instructions that when executed by processor 111 cause extension analysis computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of extension analysis computing platform 110 and/or by different computing devices that may form and/or otherwise make up extension analysis computing platform 110. For example, memory 112 may have, host, store, and/or include a browser extension rule engine 112a, a browser extension tracking database 112b, a risk analysis engine 112c, and a machine learning engine 112d.

Browser extension rule engine 112a may have instructions that direct and/or cause extension analysis computing platform 110 to, for instance, provide rules or similar policy information from a repository to carry out web browser extension analysis and/or instructions that direct extension analysis computing platform 110 to perform other functions to detect or identify potential security threats or vulnerabilities in a web browser extension, as discussed in greater detail below. Browser extension rule engine 112a may have instructions that direct and/or cause extension analysis computing platform 110 to execute advanced techniques to provide one or more browser extension tracking functions, such as tracking web browser extensions used or requested for use by users in an enterprise organization, analyzing those web browser extensions, identifying security threats or vulnerabilities in those web browser extensions, and determining corrective actions to address identified threats or vulnerabilities in those web browser extensions.

The browser extension rule engine 112a may also obtain information from a security data correlation engine, which in turn gathers data from various tools available for assessing or analyzing web browser programs, such as, CRXcavator, GIS ToolKit, a browser web stores, virus tools, threat intelligence, proxy exceptions, and the like. The browser extension rule engine 112a may also obtain information from administrator computing device 120, e.g., to update or more security rules, protocols, lists of potential threat indicators, and the like. The browser extension rule engine 112a may also obtain information from the browser extension tracking database 112b, e.g., relating to result of key threats associated with one or more browser extensions. The browser extension rule engine 112a may be configured with one or more of the following capabilities: API integration with upstream security monitoring tools, assigning potential vulnerabilities to specific commands in a web browser extension code, detecting suspicious web browser traffic based on proxy logs, auditing trails of web browser activity, gathering and storing historical threat intelligence of various browser extensions and related risk exposures, providing an analytical dashboard with a browser extension risk exposure visualization, authenticating browser extensions, analyzing new browser extensions, and the like.

Browser extension tracking database 112b may store information used by browser extension rule engine 112a and/or extension analysis computing platform 110 in application of advanced techniques to track and mitigate security threats or vulnerabilities in browser extension engines and related corrective action activities, and/or in performing other functions. Browser extension tracking database 112b may store information received from administrator computing device 120 (e.g., relating to enterprise-specific cybersecurity settings or preferences) and information from previous analysis of web browser extensions, as discussed in greater detail below.

Risk analysis engine 112c may have instructions that direct and/or cause the extension analysis computing platform 110 to process identified security threats or vulnerabilities (e.g., as determined by browser extension rule engine 112a) and to determine a risk associated with such security threats or vulnerabilities, e.g., for the purposes of identifying one or more corrective actions associated with a particular web browser extension. Based on analyzing the various received information, the risk analysis engine 112c may identify and transmit indications of key browser extension threats to other computing devices, such as the administrator computing device 120, the first user computing device 130, and/or the second user computing device 140. Based on identification of key browser extension threats, the risk analysis engine 112c may compile and provide one or more reports, such as a browser extension result report, a threat report, proxy exception revocation report, and the like. In some examples, the risk analysis engine may also receive proxy search analysis information on browser extension tracking from the browser extension tracking database 112b.

Machine learning engine 112d may have instructions that direct and/or cause the extension analysis computing platform 110 to set, define, and/or iteratively refine optimization rules and/or other parameters used by the extension analysis computing platform 110 and/or other systems in computing environment 100.

Figure 2A:
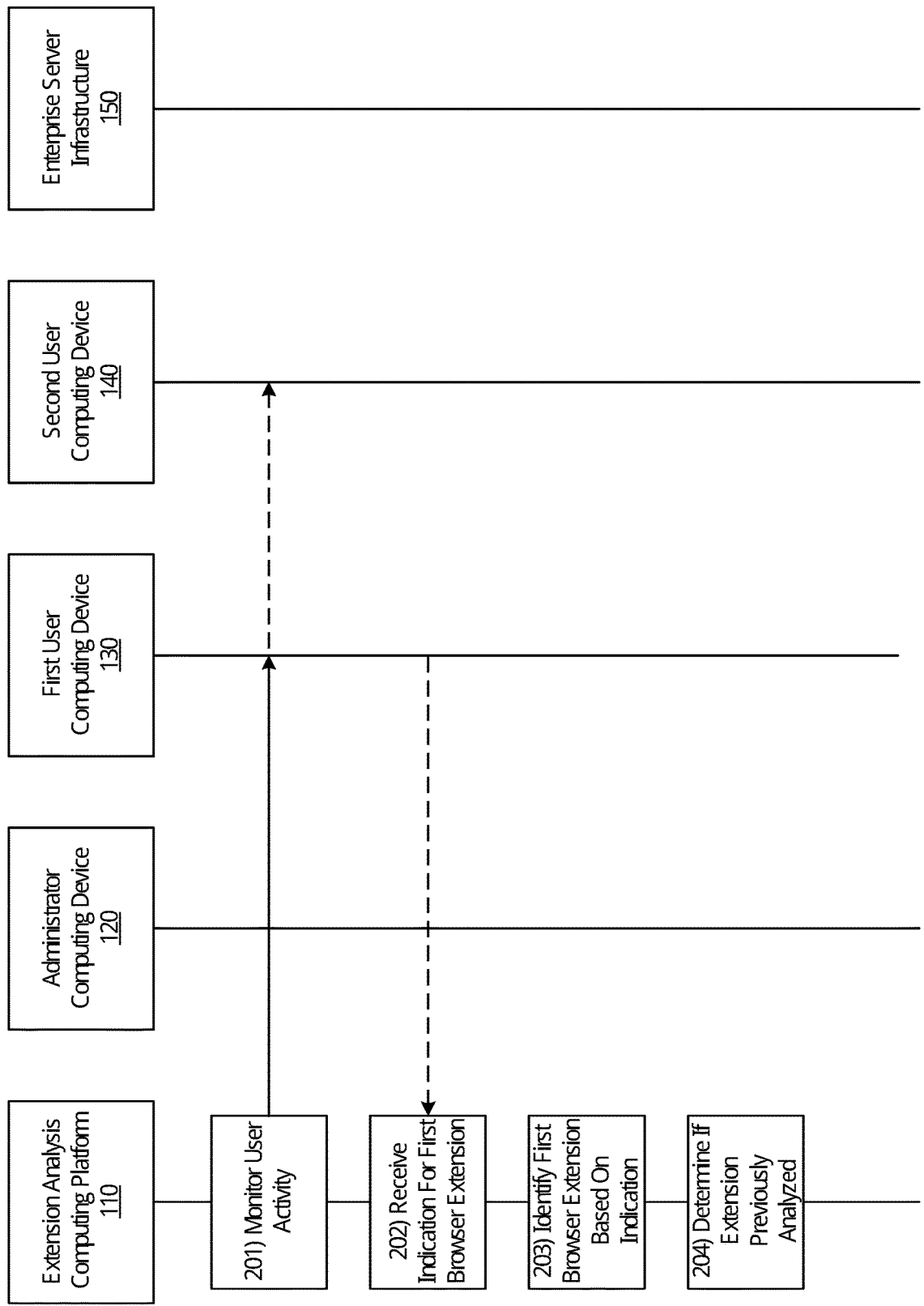

FIGS. 2A-2I depict an illustrative event sequence for tracking and mitigating security threats and vulnerabilities in browser extension engines in accordance with one or more example embodiments. Aspects of the illustrative event sequence described herein provide effective, efficient, scalable, and convenient technical solutions that address and overcome the technical problems associated with tracking and mitigating security threats and vulnerabilities in web browser extensions. Referring to FIG. 2A, at step 201, the extension analysis computing platform 110 may monitor user activity at one or more computing devices across an enterprise organization, such as first user computing device and/or second user computing device. The extension analysis computing platform 110 may monitor users' web browser activities generally, or may specifically monitor user activities related to attempts or requests to use specific web browser extensions. The user activity monitored at step 201 may be specific to certain user computing devices across an enterprise organization, specific to certain user accounts across an enterprise organization, based on rule or other settings set by an enterprise organization (e.g., received from the administrator computing device 120), and the like.

At step 202, the extension analysis computing platform 110 may receive an indication from a user computing device (e.g., the first user computing device 130) to access or otherwise use a first web browser extension. For example, the indication may be received as part of a user's web browsing activities. In that regard, the indication may be automatically received at step 202, based user browser activity relating to accessing the first web browser extension, and without user input to the extension analysis computing platform 110. In some instances, the extension analysis computing platform 110 may receive the indication during the course of monitoring user activity at step 201. In some instances, the indication received at step 202 may be responsive to a user request to analyze the first web browser extension, e.g., if a user is notified of potential vulnerabilities as part of web browsing activity and selects for the first web browser extension to be analyzed, as will be discussed in more detail below.

At step 203, the extension analysis computing platform 110 may identify the first browser extension based on the indication. In some instances, the indication may include sufficient information to describe the first browser extension. For example, the indication may include a file name or other descriptor of the first browser extension. The extension analysis computing platform 110 may store information relating to web browser extensions, such as titles, file names, and/or other descriptors, in order to identify the first web browser extension based on the information in the received indication.

At step 204, the extension analysis computing platform 110 may determine if the first browser extension was previously analyzed. The extension analysis computing platform 110 may review records and/or other information stored in the browser extension tracking database 112b as part of determining if the first browser extension was previously analyzed. In some examples, the extension analysis computing platform 110 may access and review records stored in the browser extension tracking database 112b. The records stored in the browser extension tracking database 112b may include one or more additional identifiers, descriptors, and/or other information related to analysis of a web browser extension, such as a name or title of the web browser extension, a type of browser extension, a version of the web browser extension, user account information relating to the user(s) accessing the browser extension, identified security threats or vulnerabilities, corrective actions determined in response to identified security threats or vulnerabilities, a timestamp of the analysis, and the like.

Figure 2B:
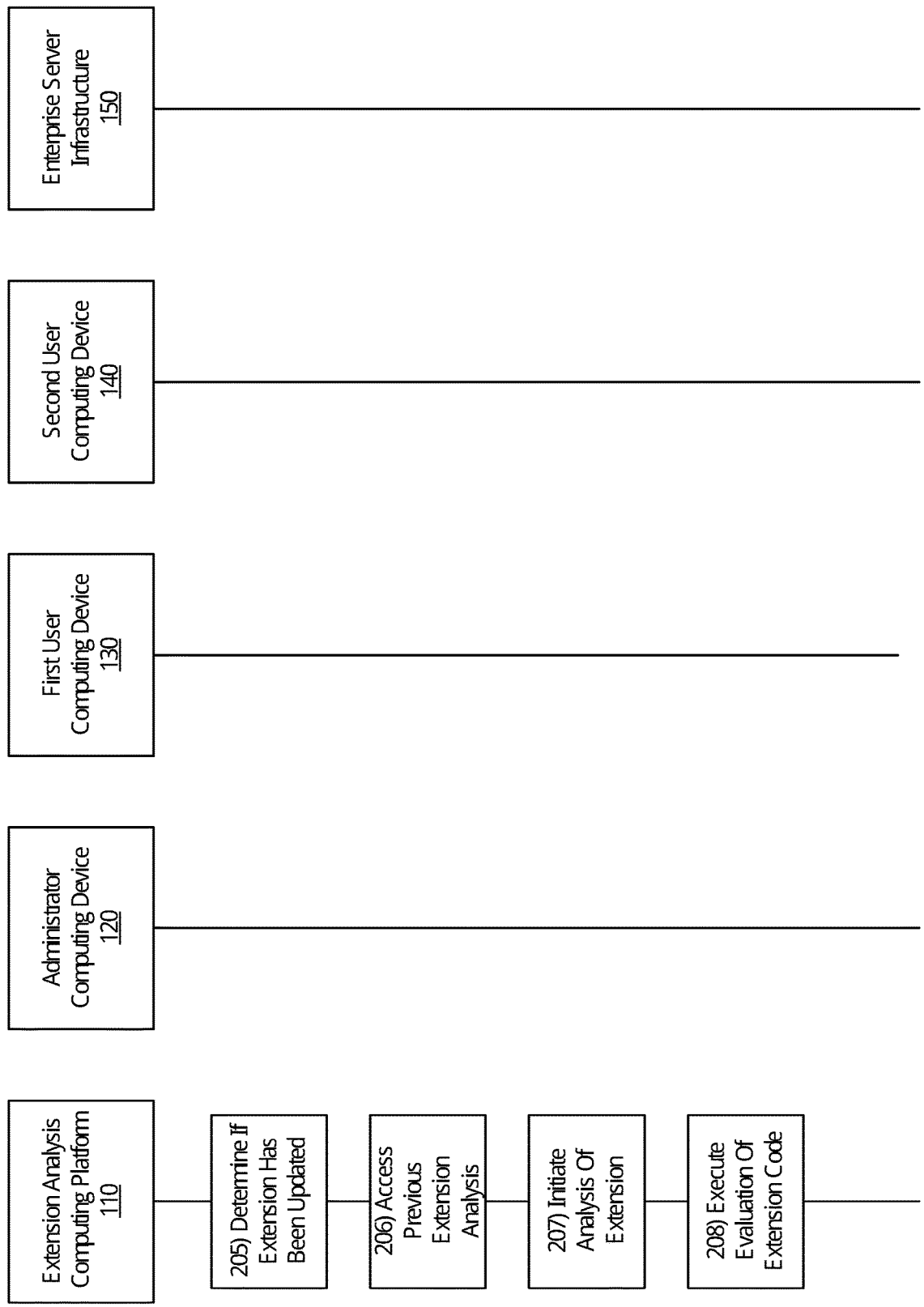

Now referring to FIG. 2B, at step 205, if the first browser extension has previously been analyzed, the extension analysis computing platform 110 may determine if the first web browser extension has been updated since the previous analysis. For example, the extension analysis computing platform 110 may access the browser extension version related to the previous analysis of the first browser extension from the records stored in the browser extension tracking database 112b, and compare that version to the version associated with the indication received at step 202. In some instances, the extension analysis computing platform 110 may review the code for the first browser extension to determine if the extension has been updated, e.g., by identifying a date of the last version update and comparing that date to the date of last version update of the previous analysis or the date of the previous analysis.

At step 206, if the first browser extension has not been updated since the last analysis, the extension analysis computing platform 110 may access the full record of the previous analysis from the browser extension tracking database 112b. The full record of the previous analysis may include one or more identifiers, descriptors, and/or other information related to analysis of a web browser extension, such as a name or title of the web browser extension, a type of browser extension, a version of the web browser extension, user account information relating to the user(s) accessing the browser extension, identified security threats or vulnerabilities, corrective actions determined in response to identified security threats or vulnerabilities, a timestamp of the analysis, and the like In some examples, the extension analysis computing platform 110 may proceed to access the full record of the previous analysis at step 206 if the first web browser extension has been updated but the extension analysis computing platform 110 has determined that the associated updates do not relate to any change in potential security threats or vulnerabilities. Upon accessing the record at step 206, the extension analysis computing platform 110 may move on to step 210, as described in more detail below.

The extension analysis computing platform 110 may proceed to step 207 if the first browser extension was not previous analyzed, or if the first web browser extension was previously analyzed but has been updated since the last analysis (e.g., and the extension analysis computing platform 110 has determined that the associated updates potentially relate to changes in security threats or vulnerabilities). At step 207, the extension analysis computing platform 110 may initiate analysis of the first browser extension. Step 207 may include one or more action suitable for setting up analysis of the first browser extension, such as accessing a manifest file or other code associated with the first browser extension. The analysis initiated at step 207 may result in identification of one or more potential vulnerabilities in the first browser extension.

At step 208, the extension analysis computing platform 110 may execute an evaluation process or examination process on code associated with the first browser extension. The evaluation process may include examining a manifest file associated with the first browser extension. For example, the evaluation process may include reviewing code associated with the first browser extension (e.g., code in the manifest file for the first browser extension) for commands that match a predefined list of commands associated with potential vulnerabilities. The predefined list of commands associated with potential vulnerabilities may be dynamically updated with the machine learning engine 112d of the extension analysis computing platform 110 based on vulnerability reports received from at least one user computing device associated with an enterprise organization. In some examples, the predefined list of commands may be set by an administrator of an enterprise organization, such as a user associated with the administrator computing device 120. In such examples, the administrator computing device 120 may periodically provide updates to the predefined list of commands, e.g., based on various updates to cybersecurity practices, based on new learning of potential vulnerabilities, and the like.

Figure 2C:
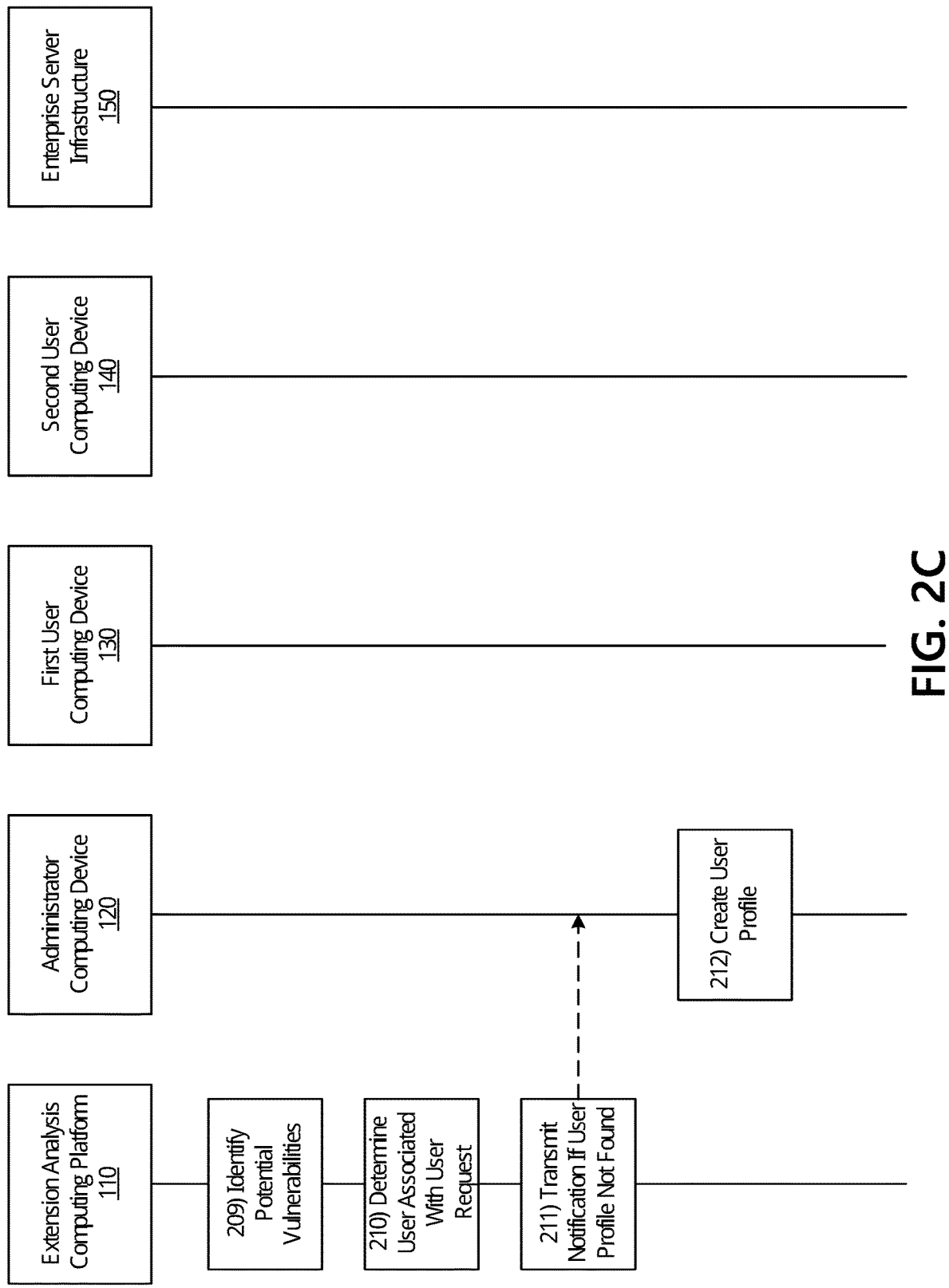

Referring to FIG. 2C, at step 209, the extension analysis computing platform 110 may identify one or more potential vulnerabilities in the first browser extension based on evaluation of the first browser extension at step 208. For example, identifying one or more potential vulnerabilities may include determining a risk level from a plurality of risk levels for each identified potential vulnerability. In some instances, one or more potential vulnerabilities may be identified based on types of potential vulnerabilities specified by an enterprise organization. For example, an enterprise organization may specify that "read/write" commands in a browser extension create potential vulnerabilities. In such examples, the extension analysis computing platform 110 may identify a potential vulnerability wherever a "read/write" command exists in the first browser extension. In some instances, the identified potential vulnerability may include a risk level selected from a plurality of risk levels.

At step 210, upon identifying at least one potential vulnerability, the extension analysis computing platform 110 may determine a user associated with the user request received at step 202. The user may be determined based on information associated with the first user computing device 130. In some examples, the user request may include a user identifier. The extension analysis computing platform 110 may determine the user based on the user identifier. In some examples, the extension analysis computing platform 110 may request user information based on the user identifier from one or more enterprise computing systems, such as the enterprise server infrastructure 150 or the administrator computing device 120. In some examples, extension analysis computing platform 110 may store certain user information in the browser extension tracking database 112b, and may access user information from the browser extension tracking database 112b at step 210.

At step 211, if a user could not be determined at step 210, the extension analysis computing platform 110 may transmit a notification to the administrator computing device 120. The notification may include an indication that a user could not be determined or a user profile does not exist for a user associated with the first user computing device 130. The notification may include a request for user information or for a user profile to be created.

At step 212, the administrator computing device 120 may create a user profile. The user profile may be created based on user information maintained by the enterprise organization and/or based on receiving user information from the user of the first user computing device 130. In some examples, the administrator computing device 120 may create a user profile at step 212 based on default user settings, e.g., with no user exceptions or with default user exceptions.

Figure 2D:
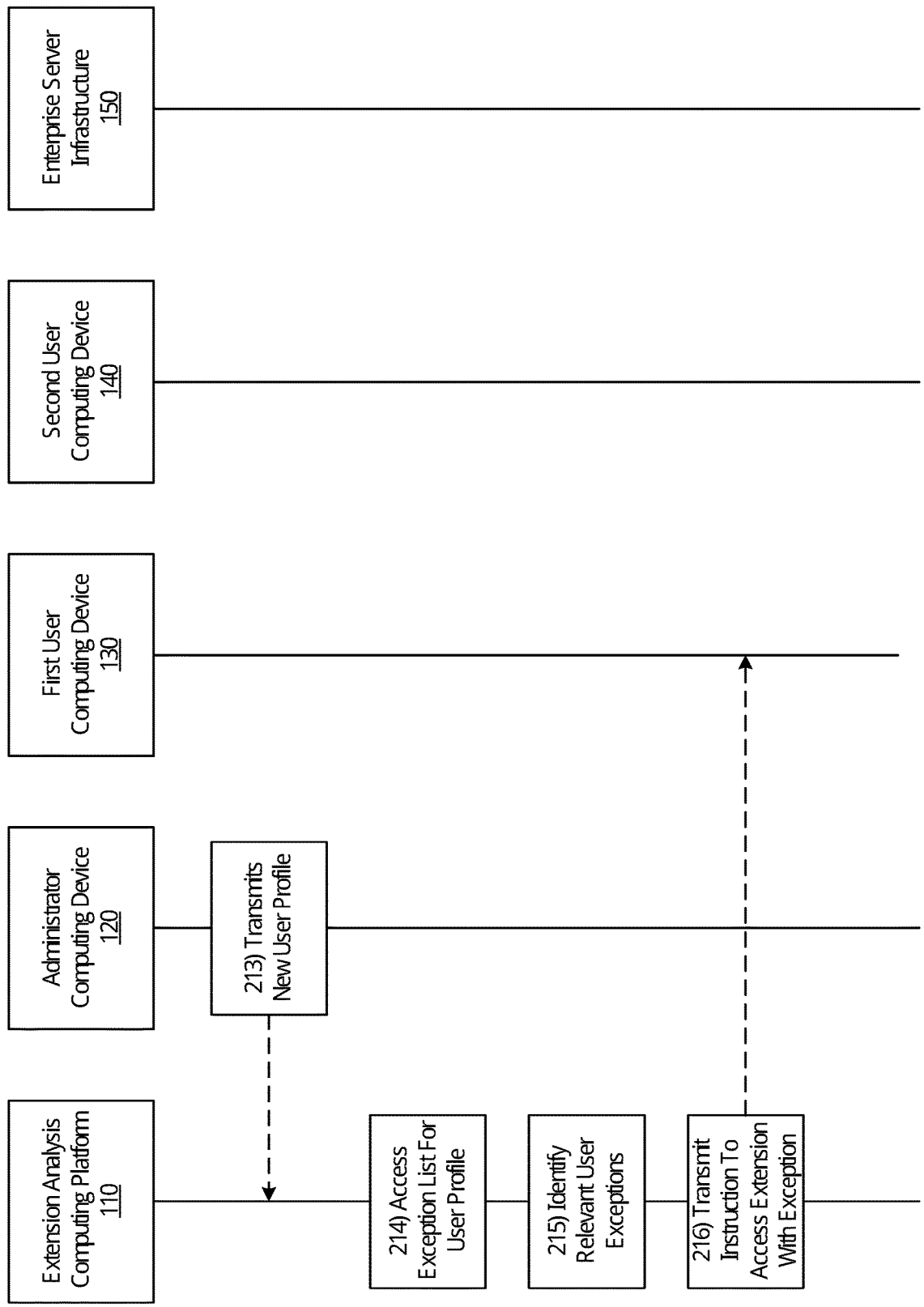

Now referring to FIG. 2D, at step 213, the administrator computing device 120 may transmit the new user profile to the extension analysis computing platform 110. At step 214, the extension analysis computing platform 110 may access an exception list based on information in the user profile. The exception list may be stored locally at the extension analysis computing platform 110, e.g., in the browser extension tracking database 112b. In some examples, the exception list may be accessed on the fly, e.g., from the administrator computing device 120 or the enterprise server infrastructure 150.

At step 215, the extension analysis computing platform 110 may identify one or more relevant user exceptions based on the one or more potential vulnerabilities determined at step 209. In some examples, user exceptions may be determined for each identified potential vulnerability. In some examples, user exceptions may be determined for the first browser extension as a whole. In some instances, a particular user may have an exception to use a browser extension regardless of the type or number of identified potential vulnerabilities. In some instances, a particular user may have an exception for certain types of potential vulnerabilities but not for other types of vulnerabilities. At step 216, upon identifying a relevant user exception, the extension analysis computing platform 110 may transmit instructions to the first user computing device 130 to allow access to the first browser extension.

Figure 2E:
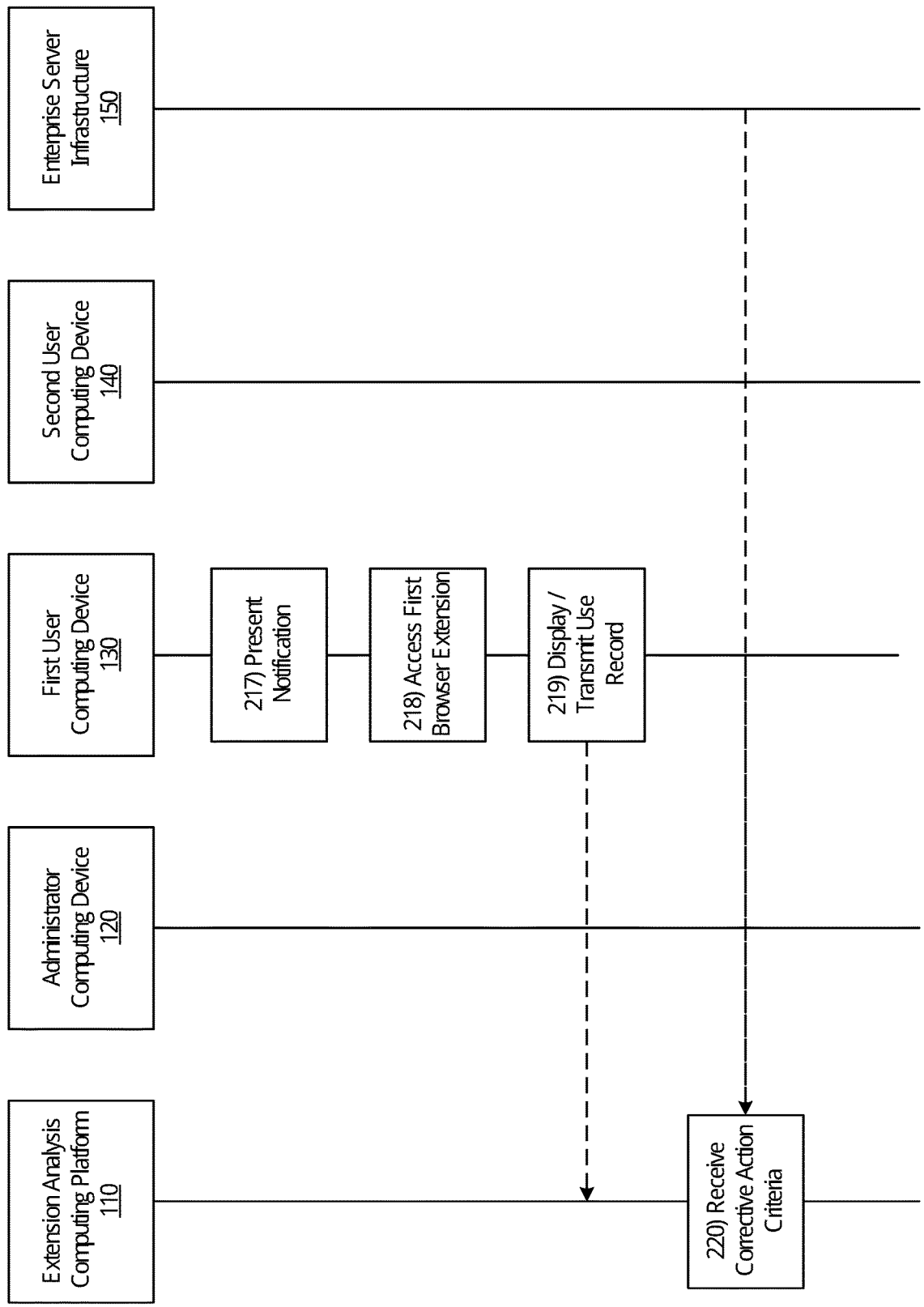

Referring to FIG. 2E, at step 217, the first user computing device 130 may present a notification indicating that the first browser extension has potential vulnerabilities but that the user has an exception to access the first browser extension. Similarly, if no potential vulnerabilities were identified for the first browser extension, the first user computing device 130 may present a notification that no potential vulnerabilities were identified in the first browser extension or the first user computing device 130 may simply allow user access to the first browser extension without any notification.

At step 218, subsequent to presenting the notification that the first browser extension has potential vulnerabilities but that the user has an exception to access the first browser extension, the first user computing device 130 may access the first browser extension. Following access to the first browser extension and/or additional browser extensions, at step 219, the first user computing device 130 may prepare, display, and/or transmit a use record to the extension analysis computing platform 110. The use record may include a list of one or more browser extensions that the first user computing device 130 used or attempted to use and an analysis of potential vulnerabilities associated with each of the one or more browser extensions. Various aspects of the use record may be stored by the extension analysis computing platform 110 for subsequent analysis and/or for refining techniques for identifying potential vulnerabilities and corrective actions, as will be described in more detail below. For example, the extension analysis computing platform 110 may train a machine learning model to data in the use record to establish one or more factors for a potential vulnerability from a browser extension.

Figure 3:
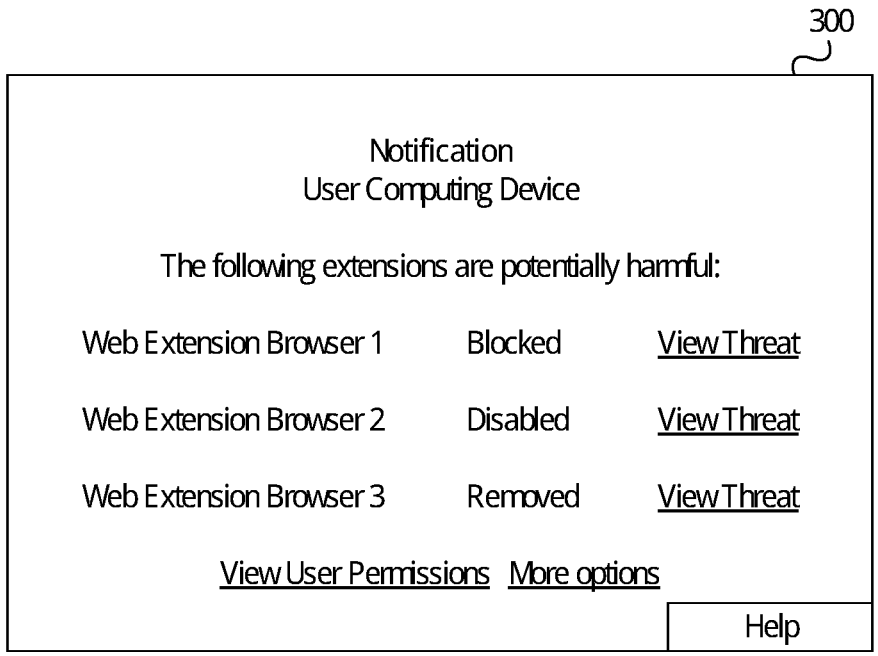
FIGS. 3-4 depict an illustrative graphical user interface for tracking and mitigating security threats and vulnerabilities in browser extension engines in accordance with one or more example embodiments.

The first user computing device 130 may display the use record at step 219 in response to a user request to do so. For example, based on or in response to the one or more commands directing the first user computing device to display an interface relating to the use record, the first user computing device 130 may display an interface with one or more components from the use record. In displaying the interface, the first user computing device 130 may display a graphical user interface similar to graphical user interface 300, which is shown in FIG. 3. For example, the first user computing device 130 may display a list of one or more web browser extensions accessed or attempted to access at the first user computing device 130, any potential vulnerabilities or threats identified in the web browser extensions, one or more corrective actions taken based on identified potential vulnerabilities, and the like. Additionally or alternatively, the graphical user interface 300 may include links to access further information for each of the identified threats, links to view user permissions and/or user exceptions, links to view options to reconfigure displayed information in graphical user interface 300, and the like. Upon selecting one or more of the links, the first user computing device 130 may provide one or more additional interfaces related to the selected link. In some examples, the web browser extensions may be sorted and displayed in a chronological order based on a timestamp of the associated web browser activity.

Returning to FIG. 2D, if, at step 215, the extension analysis computing platform 110 determines that there are no user exceptions, at step 220, the extension analysis computing platform 110 may receive corrective action criteria associated with an enterprise organization from the administrator computing device and/or the enterprise server infrastructure. In some examples, the extension analysis computing platform 110 may receive corrective action criteria on the fly, e.g., when analyzing a web browser extension. In some examples, the extension analysis computing platform 110 may initially receive and store corrective action criteria separate from analyzing web browser extensions. In such examples, the extension analysis computing platform 110 may periodically receive updates to the corrective action criteria based on changing cyber security policies with the enterprise organization, based on updates to available types of corrective actions, and the like. In some examples, the extension analysis computing platform 110 may only request corrective action criteria upon identifying one or more potential vulnerabilities in a web browser extension and upon determining that a user has no user exceptions.

Referring to FIG. 2F, at step 221, the extension analysis computing platform 110 may determine a risk level from a plurality of risk levels for each potential vulnerability. The risk level may be determined based on the type of potential vulnerability, based on preferences or other settings set by an enterprise organization, based on prior incidents associated for a type of potential vulnerability, based on a risk exposure level associated with the potential vulnerability, and the like.

At step 222, the extension analysis computing platform 110 may determine one or more corrective actions for each potential vulnerability identified in the first browser extension. The one or more corrective actions may be determined based on one or more components of the user profile, the type of potential vulnerability, based on the associated risk level, based on input from the enterprise organization (e.g., the administrator computing device 120 and/or the enterprise server infrastructure 150), and the like. In some instances, identifying one or more corrective actions may include identifying a corrective action from a corrective action list. The corrective action list may include disabling a browser extension, blocking a browser extension, removing a browser extension from a user computing device, presenting a warning to the user relating to potential vulnerabilities, presenting an option to the user to select an alternative browser extension, disabling access to a browser associated with the first browser extension, and the like. At step 223, the extension analysis computing platform 110 may transmit instructions to the first user computing device 130 to perform the one or more corrective actions. The transmitting instructions may also include instructions to present one or more notifications at the first user computing device 130.

At step 224, the first user computing device 130 may present a notification related to the instructions received at step 223. For example, the notification may include a message that the first browser extension has one or more potential vulnerabilities and/or an indication of one or more corrective actions to be performed. In some instances, the notification may include additional information relating to the risks associated with the potential vulnerabilities, e.g., to better educate users on cyber security risks. In some instances, the notification may include selectable options to provide more information relating to the identified potential vulnerability and risks associated to the potential vulnerability.

Figure 2G:
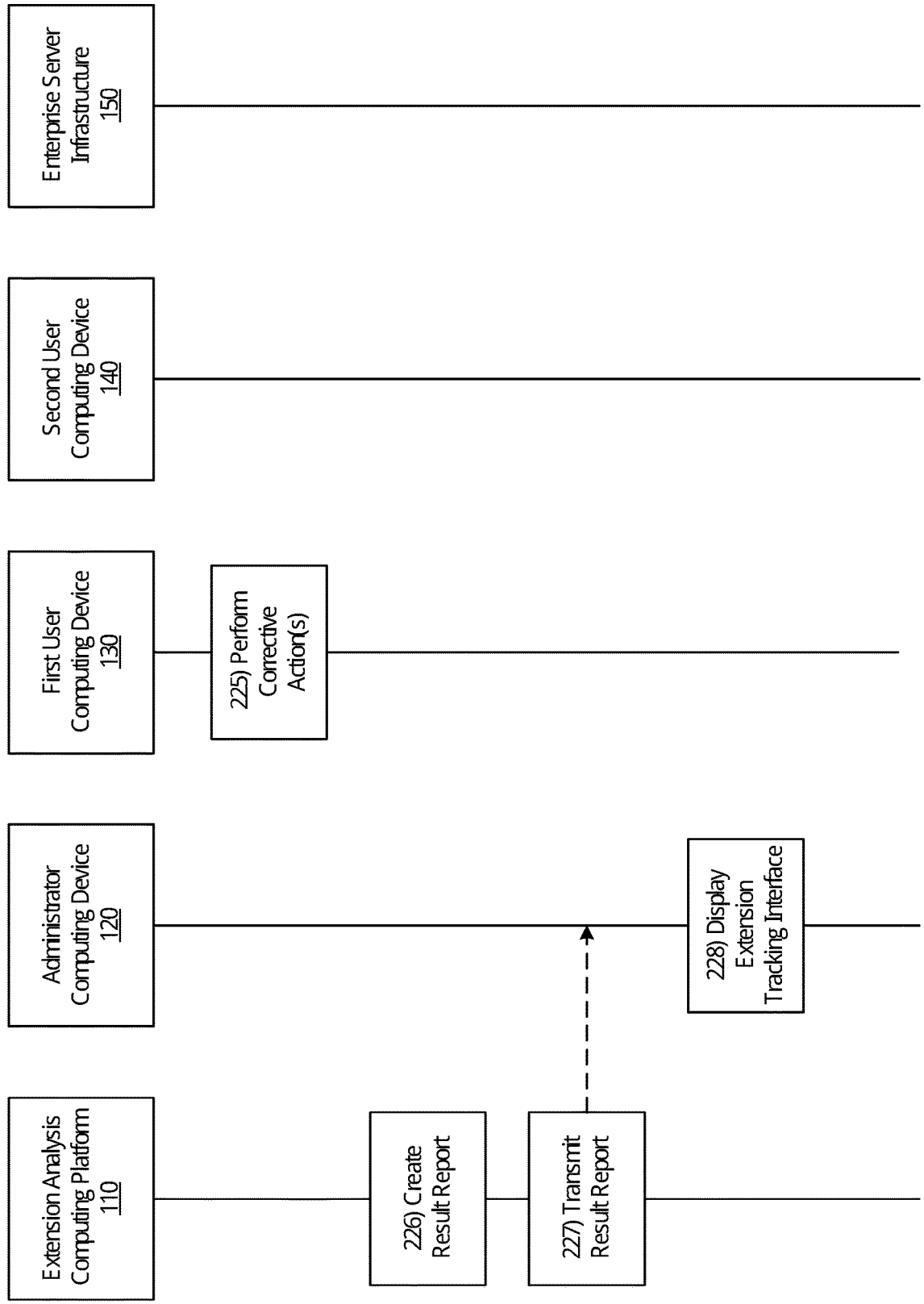

Now referring to FIG. 2G, at step 225, the first user computing device 130 may perform one or more corrective actions based on the instructions transmitted at step 223. For example, the one or more corrective actions may include disabling a browser extension, blocking a browser extension, removing a browser extension from a user computing device, presenting a warning to the user relating to potential vulnerabilities, presenting an option to the user to select an alternative browser extension, disabling access to a browser associated with the first browser extension, and the like.

At step 226, the extension analysis computing platform 110 create a result report. The result report may be created after the extension analysis computing platform 110 has repeated steps 201-225 for a plurality of web browser extensions requested to use at the first user computing device and/or for a plurality of different user computing devices, e.g., including the second user computing device 140. The result report may include a list of one or more browser extensions that the first user computing device 130 used or attempted to use and an analysis of potential vulnerabilities associated with each of the one or more browser extensions, a list of one or more browser extensions that the second user computing device 140 used or attempted to use and an analysis of potential vulnerabilities associated with each of the one or more browser extensions, and the like. Various aspects of the result report may be stored by the extension analysis computing platform 110 for subsequent analysis and/or for refining techniques for identifying potential vulnerabilities and corrective actions, as will be described in more detail below. For example, the extension analysis computing platform 110 may train a machine learning model to data in the result report to establish one or more factors for a potential vulnerability from a browser extension.

As part of step 226, the extension analysis computing platform 110 may generate an extension tracking interface associated with tracked browser extension data. In some instances, in generating the extension tracking interface, the extension analysis computing platform 110 may generate and host an application programming interface (API) repository that includes a set of APIs that may provide details on relationships between one or more records in the result report and/or other repositories of tracked browser extension data. For example, the extension analysis computing platform 110 may host APIs that may provide corresponding account activity identifiers when provided with account type identifiers or account activity type identifies. Accordingly, by implementing this API repository, the extension analysis computing platform 110 may relate information (e.g., related to types of web browser extensions, types of potential vulnerabilities, and the like) from multiple different records to a common event. In some instances, this may be advantageous for internal analytical needs and/or regulatory reporting.

Additionally or alternatively, in generating the extension tracking interface, the extension analysis computing platform 110 may generate a web based user interface that may be used for investigating and/or researching previously analyzed browser extension data (e.g., based on types of web browser extensions, types of potential vulnerabilities, and the like) to query data based on common groupings and/or other information. By generating such an interface, the extension analysis computing platform 110 may provide a full detailed view of tracked browser extension data.

In some instances, the extension analysis computing platform 110 may generate one or more commands directing an enterprise computing device of the enterprise server infrastructure 150 or a user computing device, such as the first user computing device 130 or the second user computing device 140 to display the extension tracking interface. The extension analysis computing platform 110 may send the extension tracking interface and the one or more commands directing the enterprise computing device or user computing device to display the extension tracking interface via the communication interface 113.

An enterprise computing device (e.g., administrator computing device 120) or user computing device (e.g., first user computing device 130, second user computing device 140) may receive the extension tracking interface and the one or more commands directing the computing device to display the extension tracking interface. For example, an enterprise computing device (e.g., administrator computing device 120) or user computing device (e.g., first user computing device 130, second user computing device 140) may receive the extension tracking interface and the one or more commands directing the computing device to display the extension tracking interface responsive the enterprise computing device or user computing device sending instructions to the extension analysis computing platform 110 for creation of the extension tracking interface. At step 227, the extension analysis computing platform 110 may transmit the result report and the extension tracking interface to the administrator computing device 120.

Figure 4:
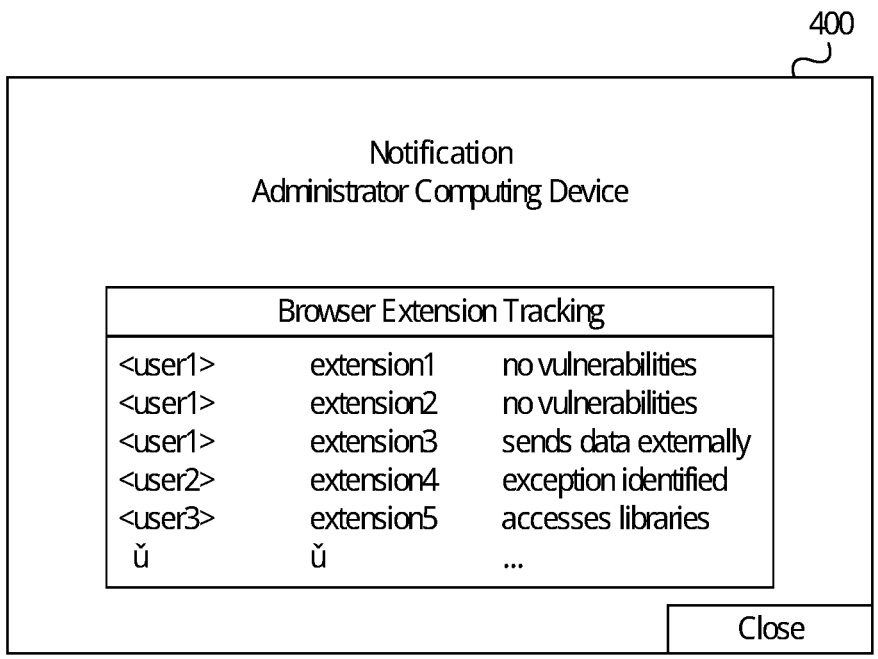

At step 228, the administrator computing device 120 may display an extension tracking interface based on information in the result report. In some instances, the result report transmitted at step 227 may cause the display of an extension tracking interface at on the administrator computing device 120 with information related to the result report, such as graphical user interface 400, which is depicted in FIG. 4. As seen in FIG. 4, graphical user interface 400 may include one or more user interface elements enabling a user of the administrator computing device 120 to display information associated with the result report, such as a scrollable listing of browser extension tracking. The displayed information may include, for each entry, user information, user computer information, web browser extension information, identified vulnerabilities, determined corrective actives, identified user exceptions, subsequent activity at the user computing device related to the web browser extensions, and the like. In some examples, user account information may also selectably be provided in the graphical user interface 400, e.g., where the enterprise computing device is authorized to view such information. In some examples, the graphical user interface 400 may include one or more interface elements to allow the user of the administrator computing device 120 to view the one or more user specific or web browser extension specific reports.

Although a single extension analysis computing platform 110 is described herein, any number of extension analysis computing platforms may be implemented using one or more of the methods described herein without departing from the scope of the disclosure. Furthermore, although the extension tracking interface is described with regard to display at the administrator computing device 120, the extension tracking interface may, in some instances, be displayed at a user device, such as the first user computing device 130 or the second user computing device 140, without departing from the scope of the disclosure.

Figure 5:
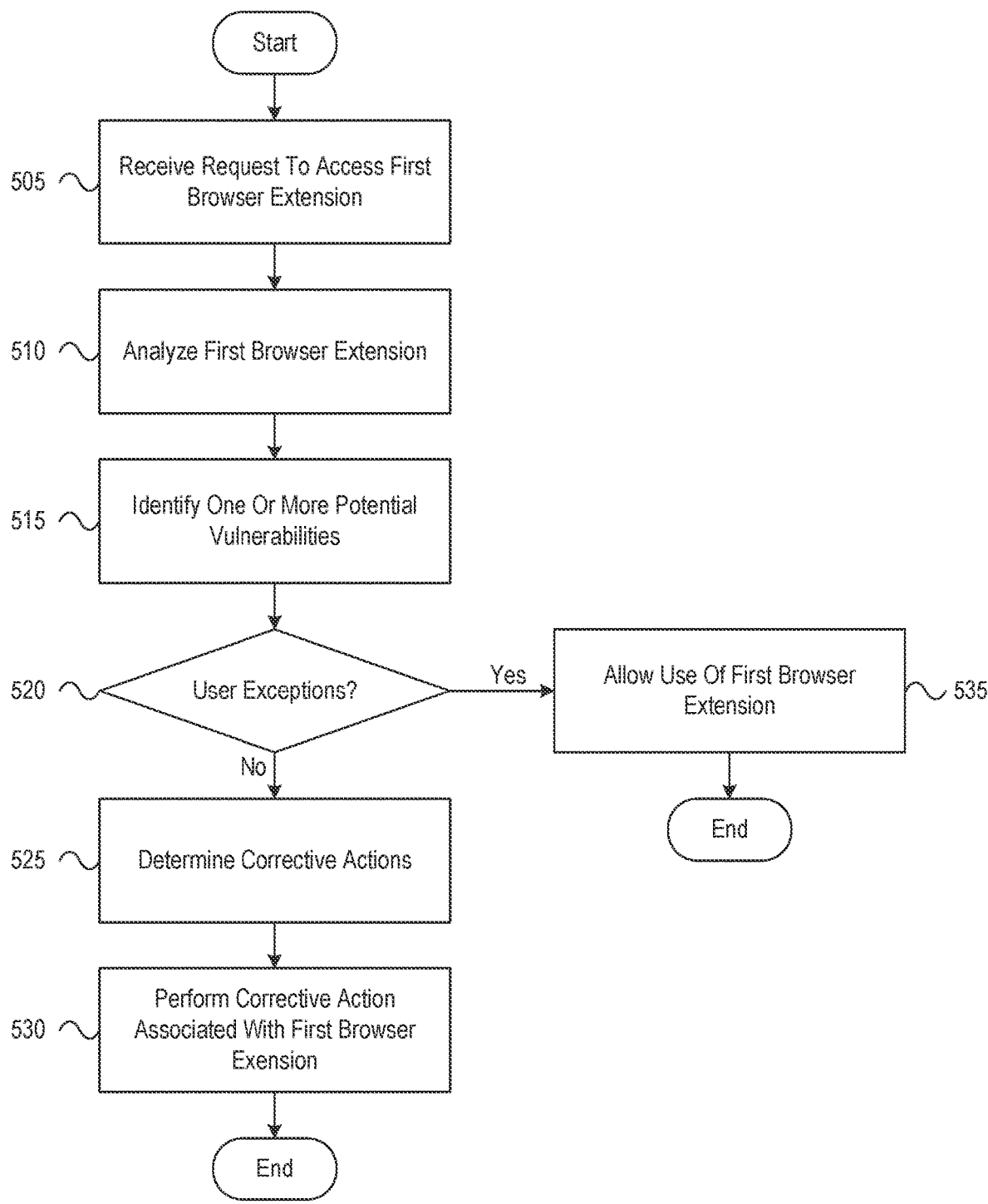
FIG. 5 depicts an illustrative method for tracking and mitigating security threats and vulnerabilities in browser extension engines in accordance with one or more example embodiments.

FIG. 5 depicts an illustrative method for tracking and mitigating security threats and vulnerabilities in browser extension engines in accordance with one or more example embodiments. Referring to FIG. 5, at step 505, a computing platform having at least one processor, a communication interface, and memory may receive an indication of a user request to access or to use a first browser extension at a first user computing device.

At step 510, the computing platform may analyze the first browser extension. Analyzing the first browser extension at step 510 may include performing an examination process on code associated with the first browser extension. Analyzing the first browser extension at step 510 may include identifying one or more commands in the first browser extension that match a predefined list of commands associated with potential vulnerabilities. At step 515, the computing platform may identify one or more potential vulnerabilities based on analysis of the first browser extension.

At step 520, the computing platform may, based on identifying one or more potential vulnerabilities, determine whether any user exceptions exist for the user associated with the user request received at step 505. User exceptions may be specific to one or more potential vulnerabilities or specific to particular users in general.

If an exception for the user is identified, at step 535, the computing platform may transmit instructions to the first user computing device to allow use of the first browser extension. The transmitted instructions may include an instruction to display a notification that the first browser extension has potential vulnerabilities and that the user has an exception to access the first browser extension and an instruction to allow the first user computing device to access the first browser extension.

At step 525, upon determining no user exceptions exist for the user associated with the user request, the computing platform may determine one or more corrective actions for each identified potential vulnerability in the first browser extension. The one or more corrective actions may be determined for each identified potential vulnerability or for the first browser extension as a whole. Identifying one or more corrective actions at step 525 may include selecting a corrective action from a corrective action list that includes disabling a browser extension, blocking a browser extension, and removing a browser extension from a user computing device.

At step 530, the computing platform may transmit instructions to the first user computing device to perform the one or more corrective actions determined at step 525. The first user computing device may subsequently perform the one or more corrective actions associated with the first browser extension. Transmitting instructions to perform one or more corrective actions may include transmitting a notification to the first user computing device that include an identification of the one or more potential vulnerabilities associated with the first browser extension.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, via the communication interface, an indication of a user request to use a first browser extension at a first user computing device;
   analyze the first browser extension, wherein the analyzing the first browser extension includes performing an examination process on code associated with the first browser extension, wherein the examination process includes reviewing code associated with the first browser extension for commands that match a predefined list of commands associated with vulnerabilities, and wherein the predefined list of commands is dynamically updated with a machine learning engine based on vulnerability reports received from an enterprise computing device tracking identified vulnerabilities from a plurality of computing devices of an enterprise system and associated corrective actions for the identified vulnerabilities;

identify one or more vulnerabilities based on analyzing the first browser extension, wherein identifying one or more vulnerabilities includes training a machine learning model to iteratively refine optimization rules used to identify one or more vulnerabilities based on data in a use record establishing one or more factors for a potential vulnerability in the first browser extension and based on one or more updates from an administrator computing device associated with the enterprise system;

based on the identifying one or more vulnerabilities, determine whether the user has an exception associated with each vulnerability based on accessing an exception list of a plurality of enterprise users from the enterprise system;

upon detecting a lack of an exception for the user for at least one vulnerability, identify at least one corrective action associated with each vulnerability;

transmit, to the first user computing device, instructions to perform the at least one corrective action; and transmit, to the administrator computing device, a result report, wherein the result report includes a list of one or more browser extensions that the first user computing device used or attempted to use and an analysis of potential vulnerabilities associated with each of the one or more browser extensions, wherein the administrator computing device is configured to compile the result report associated with the first user computing device and result reports associated with other user computing devices to create a compiled result report dataset, and to retrain the machine learning model to the compiled result report dataset to iteratively refine optimization rules used to identify one or more vulnerabilities in a browser extension.

2. The computing platform of claim 1, wherein the identifying at least one corrective action includes identifying a corrective action from a corrective action list that includes disabling a browser extension, blocking a browser extension, and removing a browser extension from a user computing device.

3. The computing platform of claim 1, wherein transmitting instructions to perform the at least one corrective action includes transmitting a notification to the first user computing device, wherein the notification includes an identification of the one or more vulnerabilities associated with the first browser extension.

4. The computing platform of claim 1, wherein the analyzing the first browser extension includes examining a manifest file associated with the first browser extension.

5. The computing platform of claim 1, wherein the analyzing the first browser extension includes determining if the first browser extension was previously analyzed and accessing a prior analysis report if the first browser extension was previously analyzed.

6. The computing platform of claim 1, wherein the analyzing the first browser extension includes determining a risk level from a plurality of risk levels for each identified vulnerability, and wherein the at least one corrective action is determined based on the risk level.

7. The computing platform of claim 1, wherein determining whether the user has an exception includes accessing a user profile from an enterprise system associated with the first user computing device.

8. The computing platform of claim 1, wherein the memory stores additional computer-readable instructions that, when executed by the at least one processor, cause the computing platform to:

upon detecting an exception for the user, transmitting, to the first user computing device, an instruction to display a notification that the first browser extension has vulnerabilities and that the user has an exception to access the first browser extension; and to allow the first user computing device to access the first browser extension.

9. The computing platform of claim 8, wherein the memory stores additional computer-readable instructions that, when executed by the at least one processor, cause the computing platform to:

receive a use record from the first user computing device, wherein the use record includes a list of one or more browser extensions that the first user computing device used or attempted to use and an analysis of vulnerabilities associated with each of the one or more browser extensions; and train the machine learning engine to data in the use record to establish one or more factors for a vulnerability from a browser extension.

10. A method comprising:

at a computing platform comprising at least one processor, a communication interface, and memory:

receiving, via the communication interface, an indication of a user request to use a first browser extension at a first user computing device;

analyzing the first browser extension, wherein the analyzing the first browser extension includes:

performing an examination process on code associated with the first browser extension, wherein the examination process includes reviewing code associated with the first browser extension for commands that match a predefined list of commands associated with vulnerabilities, and wherein the predefined list of commands is dynamically updated with a machine learning engine based on vulnerability reports received from an enterprise computing device tracking identified vulnerabilities from a plurality of computing devices of an enterprise system and associated corrective actions for the identified vulnerabilities;

identifying one or more vulnerabilities based on analyzing the first browser extension, wherein identifying one or more vulnerabilities includes training a machine learning model to iteratively refine optimization rules used to identify one or more vulnerabilities based on data in a use record establishing one or more factors for a potential vulnerability in the first browser extension and based on one or more updates from an administrator computing device associated with the enterprise system;

based on the identifying one or more vulnerabilities, determining at least one corrective action associated with each vulnerability based on accessing an exception list of a plurality of enterprise users from the enterprise system;

transmitting, to the first user computing device, instructions to perform the at least one corrective action; and transmitting, to the administrator computing device, a result report, wherein the result report includes a list of one or more browser extensions that the first user computing device used or attempted to use and an analysis of potential vulnerabilities associated with each of the one or more browser extensions, wherein the administrator computing device is configured to compile the result report associated with the first user computing device and result reports associated with other user computing devices to create a compiled result report dataset, and to retrain the machine learning model to the compiled result report dataset to iteratively refine optimization rules used to identify one or more vulnerabilities in a browser extension.

11. The method of claim 10, wherein transmitting instructions to perform the at least one corrective action includes transmitting a notification to the first user computing device, wherein the notification includes an identification of the one or more vulnerabilities associated with the first browser extension.

12. The method of claim 10, wherein the identifying the at least one corrective action includes identifying a corrective action from a corrective action list that includes disabling a browser extension, blocking a browser extension, and removing a browser extension from a user computing device.

13. The method of claim 10, wherein the analyzing the first browser extension includes determining if the first browser extension was previously analyzed and accessing a prior analysis report if the first browser extension was previously analyzed.

14. The method of claim 10, wherein the analyzing the first browser extension includes determining a risk level from a plurality of risk levels for each identified vulnerability, and wherein the at least one corrective action is determined based on the risk level.

15. The method of claim 10, further comprising:
receiving a use record from the first user computing device, wherein the use record includes a list of one or more browser extensions that the first user computing device used or attempted to use and analysis of vulnerabilities associated with each of the one or more browser extensions; and
training the machine learning engine to data in the use record to establish one or more factors for a vulnerability from a browser extension.

16. The method of claim 10, further comprising:
determining whether the user has an exception associated with each identified vulnerability; and
upon determining an exception for the user, transmitting, to the first user computing device, an instruction to display a notification that the first browser extension has vulnerabilities and that the user has an exception to access the first browser extension; and an instruction to allow the first user computing device to access the first browser extension.

17. One or more non-transitory computer-readable media storing instructions that, when executed by a computing platform comprising at least one processor, a communication interface, and memory, cause the computing platform to:
receive, via the communication interface, an indication of a user request to use a first browser extension at a first user computing device;
analyze the first browser extension, wherein the analyzing the first browser extension includes performing an examination process on code associated with the first browser extension, wherein the examination process includes reviewing code associated with the first browser extension for commands that match a predefined list of commands associated with vulnerabilities, and wherein the predefined list of commands is dynamically updated with a machine learning engine based on vulnerability reports received from an enterprise computing device tracking identified vulnerabilities from a plurality of computing devices of an enterprise system and associated corrective actions for the identified vulnerabilities;
identifying one or more vulnerabilities based on analyzing the first browser extension, wherein identifying one or more vulnerabilities includes training a machine learning model to iteratively refine optimization rules used to identify one or more vulnerabilities based on data in a use record establishing one or more factors for a potential vulnerability in the first browser extension and based on one or more updates from an administrator computing device associated with the enterprise system;
based on the identifying one or more vulnerabilities, determine whether the user has an exception associated with each vulnerability based on accessing an exception list of a plurality of enterprise users from the enterprise system;
upon determining an exception for the user, transmit instructions to the first user computing device to allow use of the first browser extension;
upon determining no exceptions for the user, transmit, to the first user computing device, instructions to perform at least one corrective action, wherein the at least one corrective action is identified based on each vulnerability; and
transmit, to the administrator computing device, a result report, wherein the result report includes a list of one or more browser extensions that the first user computing device used or attempted to use and an analysis of potential vulnerabilities associated with each of the one or more browser extensions, wherein the administrator computing device is configured to compile the result report associated with the first user computing device and result reports associated with other user computing devices to create a compiled result report dataset, and to retrain the machine learning model to the compiled result report dataset to iteratively refine optimization rules used to identify one or more vulnerabilities in a browser extension.

* * * * *